(12) United States Patent
Homma

(10) Patent No.: US 7,929,854 B2
(45) Date of Patent: Apr. 19, 2011

(54) ILLUMINATION DEVICE FOR PHOTOGRAPHY, AND CAMERA

(75) Inventor: Itaru Homma, Setagaya-ku (JP)

(73) Assignee: Nikon Corporation, Tokyo (JP)

( * ) Notice: Subject to any disclaimer, the term of this patent is extended or adjusted under 35 U.S.C. 154(b) by 918 days.

(21) Appl. No.: 11/884,238

(22) PCT Filed: Feb. 15, 2006

(86) PCT No.: PCT/JP2006/302607
§ 371 (c)(1),
(2), (4) Date: Aug. 13, 2007

(87) PCT Pub. No.: WO2006/088039
PCT Pub. Date: Aug. 24, 2006

(65) Prior Publication Data
US 2010/0183289 A1 Jul. 22, 2010

(30) Foreign Application Priority Data
Feb. 16, 2005 (JP) ................................. 2005-038920

(51) Int. Cl.
G03B 15/03 (2006.01)
H04N 5/222 (2006.01)
(52) U.S. Cl. .......................... 396/164; 396/166; 348/371
(58) Field of Classification Search .................. 396/164, 396/155, 166, 167; 348/371
See application file for complete search history.

(56) References Cited

U.S. PATENT DOCUMENTS
2005/0122420 A1  6/2005  Matsui

FOREIGN PATENT DOCUMENTS
| JP | A 56-142516 | 11/1981 |
| JP | A 10-206942 | 8/1998 |
| JP | A 2002-207236 | 7/2002 |
| JP | A 2005-099349 | 4/2005 |
| JP | A 2005-128403 | 5/2005 |
| JP | A 2005-165204 | 6/2005 |

*Primary Examiner* — Rochelle-Ann J Blackman
(74) *Attorney, Agent, or Firm* — Oliff & Berridge, PLC

(57) ABSTRACT

An illumination device for photography includes: a light emission unit that emits illumination light towards a photographic subject; and a control unit that performs control so as to change a light emission luminance of the light emission unit within an exposure time period that is set to the camera.

14 Claims, 4 Drawing Sheets

ILLUMINATION DEVICE FOR PHOTOGRAPHY, AND CAMERA

TECHNICAL FIELD

The present invention relates to an illumination device that illuminates a photographic subject during photography.

BACKGROUND ART

In an illumination device that illuminates a photographic subject during photography, it is known to provide a LED as a light emission element (refer to Patent Document #1). In Patent Document #1, an illumination device is disclosed that is provided with a xenon lamp and an LED, and a technique is described for turning on an LED that emits red colored light or an LED that emits blue colored light, in order to correct the color temperature of the flash light emitted by the xenon lamp. With regard to the amount of light emitted by the LED, it is shown in the drawings (FIGS. 4 through 6) to vary the length of its time period of illumination (light emission) according to the distance to the photographic subject and the amount of color temperature compensation.

Patent Document #1: Japanese Laid-Open Patent Publication H10-206942.

DISCLOSURE OF THE INVENTION

Problems to be Solved by the Invention

When the light emission element is caused to emit light for a long period of time during photography of a photographic subject that is shifting, the photographic subject that has been illuminated is photographed as though it is flowing upon the screen, and a sense of discomfort is imparted to the person who is observing the photographic image. Particularly, a problem can easily occur during consecutive photography of a plurality of frames with the shutter time for one frame being around 1/30 second, as during movie shooting, or the like.

Means for Solving the Problems

According to the 1st aspect of the present invention, an illumination device for photography comprises: a light emission unit that emits illumination light towards a photographic subject; and a control unit that performs control so as to change a light emission luminance of the light emission unit within an exposure time period that is set to the camera.

According to the 2nd aspect of the present invention, in the illumination device for photography according to the 1st aspect, it is preferred that: the light emission unit is of an electrical current control type; there is further provided an electrical current supply unit that supplies drive electrical current to the light emission unit; and the control unit controls the electrical current supply unit so as to supply to the light emission unit an electrical current that causes the light emission luminance of the light emission unit to change within the exposure time period that is set to the camera.

According to the 3rd aspect of the present invention, in the illumination device for photography according to the 2nd aspect, it is preferred that the control unit controls the electrical current supply unit so that a value of the electrical current supplied to the light emission unit changes.

According to the 4th aspect of the present invention, in the illumination device for photography according to the 2nd or the 3rd aspect, it is preferred that: the light emission unit comprises a plurality of light emission elements; and the control unit controls the electrical current supply unit so as to change the number of the light emission elements to which the electrical current is supplied.

According to the 5th aspect of the present invention, in the illumination device for photography according to any one of the 1st through the 4th aspects, it is preferred that the control unit performs control so that, within the exposure time period, the light emission luminance of the light emission unit becomes greater during an end of light emission than during a start of light emission.

According to the 6th aspect of the present invention, in the illumination device for photography according to the 5th aspect, it is preferred that the control unit performs control so that, within the exposure time period, a luminance according to a first light emission time period is made as a first light emission luminance, and a luminance according to a second light emission time period that succeeds the first light emission time period is made as a second light emission luminance that is higher than the first light emission luminance.

According to the 7th aspect of the present invention, in the illumination device for photography according to the 6th aspect, it is preferred that the control unit performs control so that the second light emission time period becomes shorter than the first light emission time period.

According to the 8th aspect of the present invention, in the illumination device for photography according to the 6th or the 7th aspect, it is preferred that the second light emission time period is included within a predetermined time period directly before the end of the exposure time period.

According to the 9th aspect of the present invention, in the illumination device for photography according to any one of the 1st through the 8th aspects, it is preferred that the control unit performs control so that the light emission luminance of the light emission unit is changed, when the exposure time period is longer than a predetermined shutter setting.

According to the 10th aspect of the present invention, in the illumination device for photography according to any one of the 1st through the 8th aspects, it is preferred that the control unit performs control so that the light emission luminance of the light emission unit is changed in each frame, if the camera is set to a movie shooting mode.

According to the 11th aspect of the present invention, in the illumination device for photography according to the 10th aspect, it is preferred that the control unit performs control so that the emission of light by the light emission unit is stopped at least outside the exposure time period of each frame, if the camera is set to the movie shooting mode.

According to the 12th aspect of the present invention, in the illumination device for photography according to the 1st aspect, it is preferred that the control unit performs control so as to be able to change over between a first control method in which it performs control so that, within the exposure time period, the light emission luminance of the light emission unit gradually increases from when light emission starts to when light emission ends, and a second control method in which it performs control so that, within the exposure time period, a luminance according to a first light emission time period is made as a first light emission luminance, and a luminance according to a second light emission time period that succeeds the first light emission time period is made as a second light emission luminance that is higher than the first light emission luminance.

According to the 13th aspect of the present invention, a camera comprises an illumination device for photography according to any one of the 1st through the 12th aspects.

According to the 14th aspect of the present invention, a camera comprises: an image-capturing unit that captures an image of a photographic subject; an exposure control unit that controls an exposure time period of the image-capturing unit; and an illumination unit for photography, and the illumination unit for photography comprises a light emission unit that emits illumination light towards a photographic subject, and a control unit that performs control so as to change a light emission luminance of the light emission unit within the exposure time period.

Advantageous Effect of the Invention

With the illumination device for photography and the camera of the present invention, since it is arranged to change the light emission luminance within the exposure time period to which the camera is set, accordingly it is possible to ensure that the person who is observing the photographic image does not experience any sense of discomfort, even if the illumination light that illuminates a photographic subject that is shifting is emitted over a long time period.

BEST MODE FOR CARRYING OUT THE INVENTION

Figure 1:
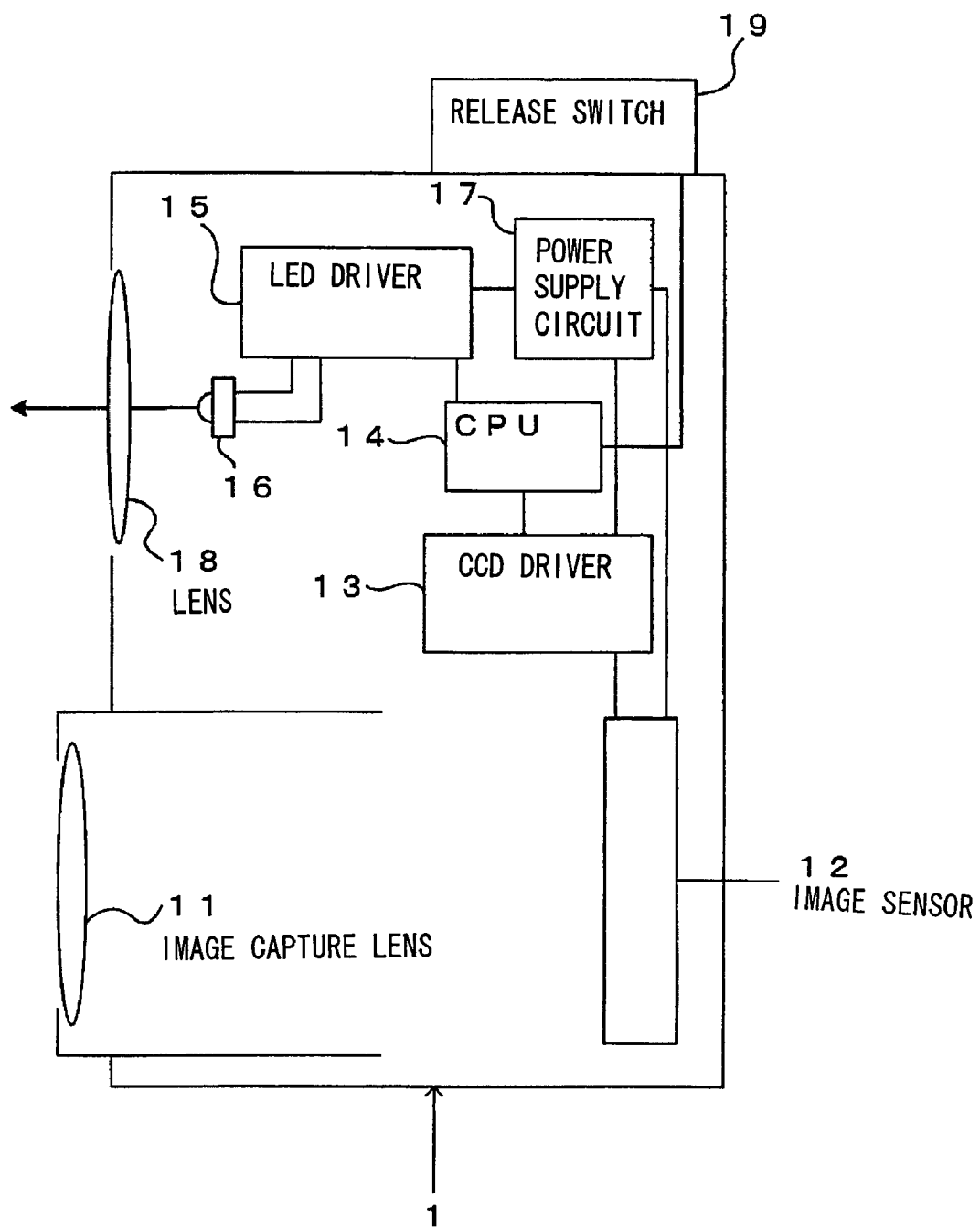
FIG. 1 is a figure for explanation of the main structure of an electronic camera according to an embodiment of the present invention.

In the following, preferred embodiments for implementation of the present invention will be explained with reference to the drawings. FIG. 1 is a figure for explanation of the main structure of an electronic camera according to an embodiment of the present invention. In FIG. 1, the electronic camera 1 includes an image capture lens 11, an image sensor (an image capture element) 12, a CCD driver 13, a CPU 14, a LED driver 15, an LED 16, a power supply circuit 17, an illumination light lens 18, and a release switch 19.

The image capture lens 11 images an image of a photographic subject upon an image capture surface of the image sensor 12. This image sensor 12 is made from a CCD image sensor or a CMOS image sensor or the like, and accumulates electrical charges by units of picture elements according to the amount of light that is incident upon its image capture surface. In other words, the image sensor 12 captures an image of the photographic subject. The charges that have been accumulated upon this image sensor 12 are sent (transferred) to an image processing circuit not shown in the figures according to a timing signal that is supplied from the CCD driver (drive circuit) 13, and predetermined signal processing is performed thereupon by the image processing circuit.

The CCD driver 13 generates a timing signal that drives the above described image sensor 12 according to a command from the CPU 14, and supplies this generated drive signal to the image sensor 12. The CPU 14 sends control signal to each of the blocks in this electronic camera 1 that includes the CCD driver 13, and thereby controls the camera operation of the electronic camera 1. The CPU 14 is configured to start the photographic operation of the electronic camera 1 when an actuation signal is inputted from the release switch 19. It should be understood that this electronic camera 1 is endowed with a still image photographic mode in which, when the release actuation signal is inputted, it performs photography once, and a movie shooting mode (a moving image photographic mode) in which, when the release actuation signal is inputted, it repeatedly performs photography of a plurality of frames at a predetermined frame rate.

The LED driver (drive circuit) 15 generates a drive electrical current for causing the LED 16 to emit light, and supplies this drive electrical current to the LED 16 according to commands from the CPU 14. The LED 16 is made from an LED that emits so called white colored light. As is well known, an LED is an electrical current control type device that, in its rated range, has a proportional relationship between the drive electrical current and its light emission intensity (optical power). By a value for the drive electrical current to be supplied from the LED driver 15 to the LED 16 being commanded by the CPU 14, the amount of light emitted from the LED 16 is controlled.

The light that has been emitted from the LED 16 is emitted in the direction of the photographic subject via the illumination light lens 18, and illuminates the main photographic subject. And the power supply circuit 17 supplies the necessary electrical power to the various blocks within the electronic camera 1.

When emission of light by the LED 16 is permitted, the CPU 14 commands the LED driver 15 to emit the light of the LED 16 during photography. This emission of light by the LED 16 is permitted in the following cases:

1. When, in the state with the electronic camera 1 being set to an "auto mode" in which light emission by the LED 16 is determined to be performed or not upon according to the luminance of the main photographic subject, the CPU 14 determines that the emission of light is necessary.

2. When the electronic camera is set to a "forcible light emission mode" in which the LED 16 is caused to emit light, irrespective of the above described luminance of the main photographic subject.

The present invention is distinguished by the nature of the drive electrical current that is supplied to the LED, in order thus to cause the LED 16 to emit light.

Figure 2:
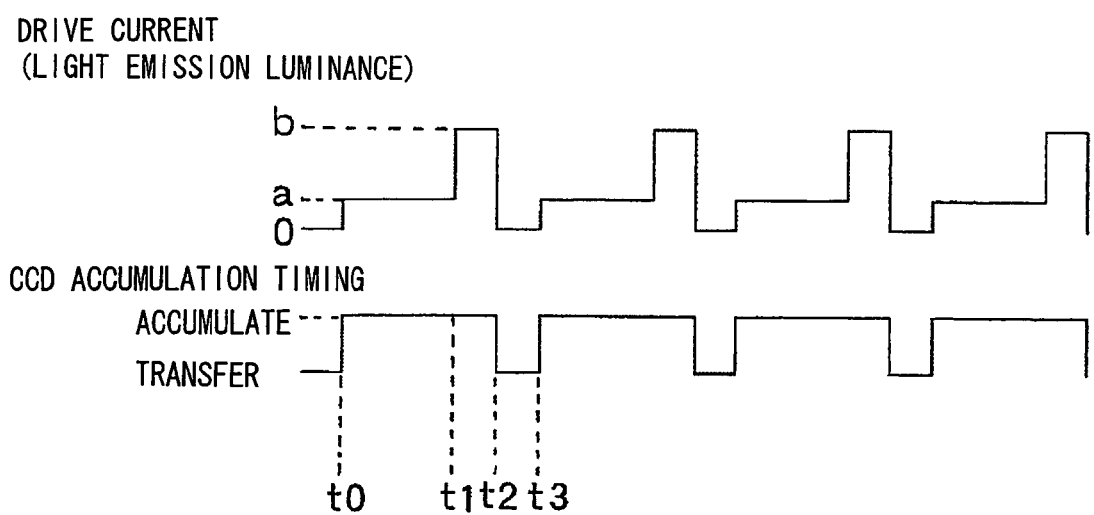
FIG. 2 is a figure for explanation of the relationship between the drive electrical current supplied to an LED (i.e. the light emission luminance) and time, and of the relationship between charge accumulation timing of an image sensor and time.

FIG. 2 is a figure for explanation, in the state in which the electronic camera 1 is set to the movie shooting mode, of the relationship between the drive electrical current supplied to the LED 16 from the LED driver 15 (i.e. the light emission luminance) and time, and of the relationship between charge accumulation timing of the image sensor 12 and time. In FIG. 2, time is shown along the horizontal axis of the drive current waveform, while the drive current is shown along the vertical axis of the drive current waveform. Moreover, time is shown along the horizontal axis of the charge accumulation timing waveform, while the state of charge accumulation/charge transfer is shown along the vertical axis of the charge accumulation timing waveform.

When a release actuation signal is inputted from the release switch 19, the CPU 14 starts, for example, image capture at a frame rate of 30 frames per one second. In this case, the shutter setting (i.e. the charge accumulation time for the image sensor 12; the exposure time) is determined, along with an aperture value, by performing a well known method of exposure calculation using the luminance of the photographic subject as detected by a photometric circuit not shown in the figures of the CPU 14, and the image capture sensitivity (i.e. the ISO sensitivity) that is set for the image sensor 12. This shutter setting is set by taking the range that can be accommodated within the above described frame rate as an upper limit, and is set, for example, to longer than 1/60 sec. If the shutter setting that is obtained by this exposure calculation is shorter than 1/60 seconds, then the CPU 14 ensures a shutter setting that is longer than 1/60 sec. by decreasing the image capture sensitivity (i.e. the ISO sensitivity) of the image sensor 12.

At the time point t0, along with commanding the CCD driver 13 to start charge accumulation by the image sensor 12, the CPU 14 also commands the LED driver 15 to supply drive electrical current of current value a to the LED 16.

At a time point t1 that is a predetermined time period before the time point t2 at which the accumulation of charge ends, the CPU 14 commands the LED driver 15 to increase the drive electrical current supplied to the LED 16 from the current value a to a current value b. Due to this, the luminance of the light emission by the LED 16 increases stepwise within the shutter setting (in this case, the charge accumulation time period from the time point t0 to the time point t2). In other words, a light emission time period from the time point t1 to the time point t2 is included within the predetermined time period directly before the end of the exposure time period.

At the time point t2, the CPU 14, along with ending the charge accumulation by the image sensor 12, also commands the CCD driver 13 to perform transfer of the electric charge accumulated in the image sensor 12. Moreover, the CPU 14 also commands the LED driver 15 to stop supply of electrical current to the LED 16. Due to this, the emission of light by the LED 16 is stopped when charge is not being accumulated.

The control described above shows that, as compared to the light emission luminance of the LED 16 (the first light emission luminance) during the time period from the time point t0 to the time point t1 (the first light emission time period), the light emission luminance of the LED 16 (the second light emission luminance) during the time period from the time point t1 to the time point t2 (the second light emission time period) that continues on from that time period from the time point t0 to the time point t1 (the first light emission time period) is higher. To put it in another manner, the light emission luminance of the LED 16 when it stops emitting light is greater than the light emission luminance of the LED 16 when it starts emitting light.

At the time point t3, after the end of electric charge transfer, when the image capture of the next frame starts, the CPU 14, along with commanding the CCD driver 13 to start accumulation of charge by the image sensor 12, also commands the LED driver 15 to supply drive electrical current of the value a to the LED 16. Subsequently, in a similar manner, the operation of changing the supplied electrical current stepwise so as to enhance the light emission luminance of the LED 16 during charge accumulation by the image sensor 12, and of stopping the emission of light by the LED 16 when the charge accumulation by the image sensor 12 ends, is repeated.

When a release actuation signal is inputted for a second time from the release switch 19, and when charge accumulation and transfer of accumulated electric charge for the frame for which they were performed by the image sensor 12 at this time point has been completed, the CPU 14 ends a series of movie shooting.

The amount of light emitted by the LED 16 per one frame as described above is determined by the CPU 14 during the exposure calculation described above. And the CPU 14 determines the electrical current value a and the electrical current value b that are to be supplied to the LED 16, so as to make the sum of the integrated value over time of the light emitted by the LED 16 in the state in which the current value a is being supplied, and of the integrated value over time of the light emitted by the LED 16 in the state in which the current value b is being supplied, become the amount of light per one frame that has been thus determined.

For the relationship between the light emission intensity (luminance) of the LED 16 and the drive electrical current, results that are actually measured in advance are converted into a table and are stored in a non-volatile memory within the CPU 14. The CPU 14 determines the required drive electrical current by referring to the above described table while taking the light emission intensity (luminance) as an argument, and commands the LED driver 15 to supply this electrical current value to the LED 16.

According to the embodiment explained above, the following beneficial operational effects are obtained:

(1) The electronic camera 1 that is set to the movie shooting mode and upon which light emission by the LED 16 is permitted is controlled by the CPU 14 in the following manner. That is, during photography, the shutter setting is set to longer than 1/60 sec., and the LED 16 is caused to emit light by supply of the electrical current value a from the time point t0 of a start of charge accumulation by the image sensor 12 to the time point t1; and, from the time point t1 to the charge accumulation end time point t2, the LED 16 is caused to emit light by supply of the electrical current value b (where b>a).

Due to this, the amount of light that illuminates the main photographic subject increases stepwise partway through the charge accumulation time period (the exposure time period). As a result, when photographing a photographic subject that is shifting, since the contour of the photographic subject image that is being image captured from the time point t1 to the time point t2 is brought out more clearly than the contour of the photographic subject image that is being image captured from the time point t0 to the time point t1, accordingly it becomes easy, from the point of view of the observer of the photographic image, to understand that the photographic subject is shifting, and an image is obtained in which any sense of discomfort has been suppressed, as in so called rear curtain synchronization photography.

Figure 3:
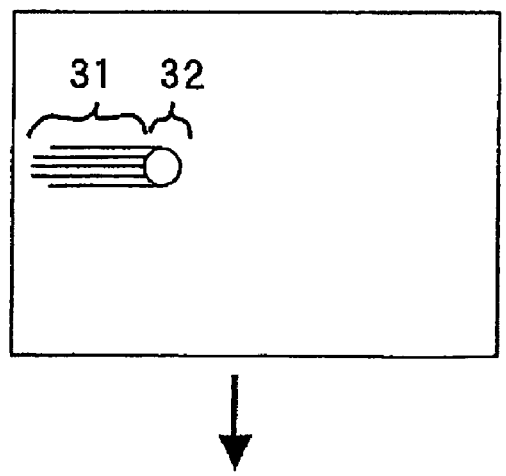
FIG. 3 is a figure showing an example of one photographic image of frames taken consecutively in time series.
Figure 4:
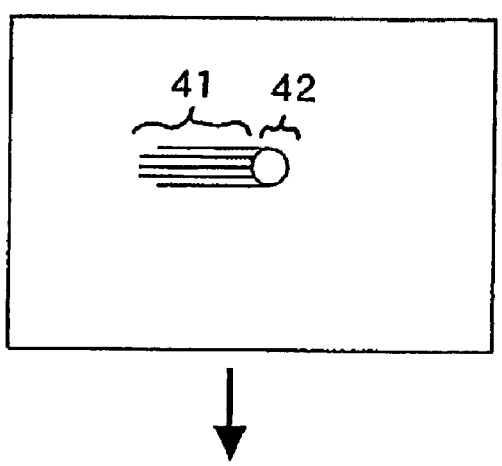
FIG. 4 is a figure showing an example of one photographic image of frames taken consecutively in time series.
Figure 5:
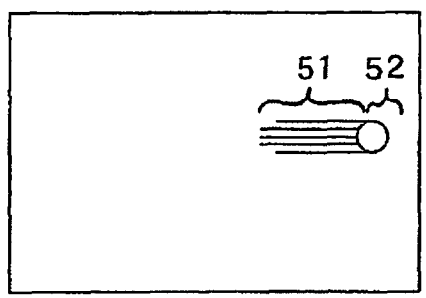
FIG. 5 is a figure showing an example of one photographic image of frames taken consecutively in time series.

FIGS. 3 through 5 are figures showing examples of photographic images for successive frames in time series. In FIGS. 3 through 5, the same photographic subject that shifts in the direction from left to right is being photographed with an electronic camera 1 that is fixed to a tripod or the like. The image 31 of FIG. 3 corresponds to an image of the photographic subject that is captured from the time point t0 to the time point t1 (in the state in which the luminance of the illumination light is low), while the image 32 corresponds to an image of the photographic subject that is captured from the time point t1 to the time point t2 (in the state in which the luminance of the illumination light is high). And the image 41 of FIG. 4 corresponds to an image of the photographic subject in this frame that is captured from the time point t0 to the time point t1 (in the state in which the luminance of the illumination light is low), while the image 42 corresponds to an image of the photographic subject that is captured from the time point t1 to the time point t2 (in the state in which the luminance of the illumination light is high). Moreover, the image 51 of FIG. 5 corresponds to an image of the photographic subject in this frame that is captured from the time point t0 to the time point t1 (in the state in which the luminance of the illumination light is low), while the image 52 corresponds to an image of the photographic subject that is captured from the time point t1 to the time point t2 (in the state in which the luminance of the illumination light is high).

If similar photography to the cases shown in FIGS. 3 through 5 were to be performed with the light emission luminance of the LED 16 kept constant during the charge accumulation by the image sensor 12, then, since the contour of the image of the photographic subject would, in each frame, be observed as constant by an observer of these photographic images, accordingly it would become impossible for the observer to tell the shifting direction of the photographic subject in these frames, and this would be undesirable. By contrast, in this embodiment, by changing the luminance of the illumination light during charge accumulation by the image sensor 12 so as to enhance it, the contour of the image of the photographic subject that is captured is made more clear from a point that is later in temporal sequence, so that it is possible to perform photography in such a manner that the direction of shifting of the photographic subject can be understood.

(2) Since, as compared to the time period from the time point t0 to the time point t1 (the state in which the luminance of the illumination light is low), the time period from the time point t1 to the time point t2 (the state in which the luminance of the illumination light is high) is made to be shorter, accordingly it is possible to accentuate its image in the image of the photographic subject. Due to this, it is possible to manifest the beneficial operational effect of (1) described above in a sufficient manner.

(3) Since the image capturing sensitivity of the image sensor 12 is changed so as to set the shutter setting to longer than 1/60 sec., accordingly it is possible to perform the photography described in (1) above, even when the luminance of the photographic subject is high.

Variant Embodiments

Figure 6:
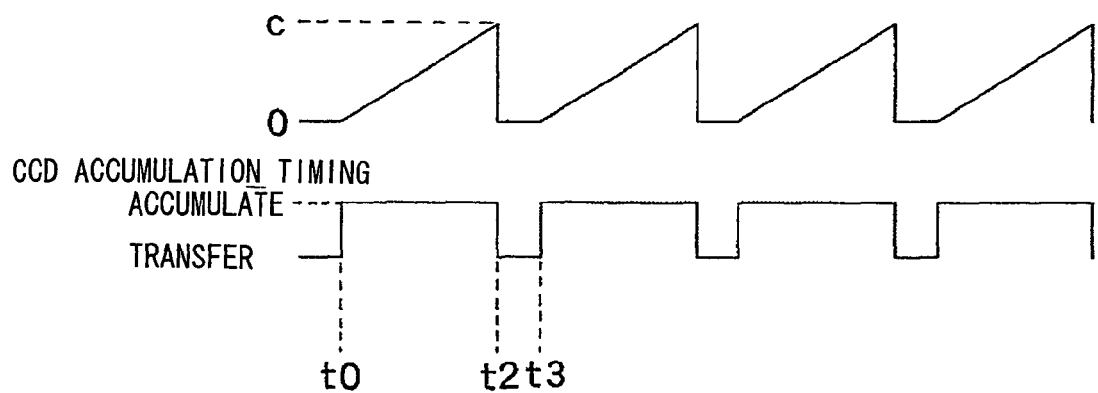
FIG. 6 is a figure relating to a variant embodiment, for explanation of the relationship between the drive electrical current supplied to an LED (i.e. the light emission luminance) and time, and of the relationship between charge accumulation timing of the image sensor and time.

It would also be acceptable to arrange to increase the luminance of the light emission by the LED 16 gradually, within the range of exposure time period that corresponds to the shutter setting that is set. FIG. 6 is a figure for explanation, in this case, of the relationship between the drive electrical current supplied from the LED driver 15 to the LED 16 (i.e. the light emission luminance) and time, and of the relationship between charge accumulation timing of the image sensor 12 and time. In FIG. 6, time is shown along the horizontal axis of the drive current waveform, while the drive current is shown along the vertical axis of the drive current waveform. Moreover, time is shown along the horizontal axis of the charge accumulation timing waveform, while the state of charge accumulation/charge transfer is shown along the vertical axis of the charge accumulation timing waveform.

At the time point t0 after a release actuation signal has been inputted from the release switch 19, along with commanding the CCD driver 13 to start charge accumulation by the image sensor 12, the CPU 14 also commands the LED driver 15 to supply drive electrical current to the LED 16.

And the LED driver 15 gradually increases the drive electrical current that is supplied to the LED 16, so that the value of this drive electrical current that is supplied to the LED 16 attains its maximum value c at the time point t2 at which the charge accumulation ends.

At this time point t2, the CPU 14, along with ending the charge accumulation by the image sensor 12, also commands the CCD driver 13 to perform transfer of the electric charge accumulated in the image sensor 12. Moreover, the CPU 14 also commands the LED driver 15 to stop supply of electrical current to the LED 16. Due to this, the emission of light by the LED 16 is stopped when charge is not being accumulated.

At the time point t3, after the end of electric charge transfer, when the image capture of the next frame starts, the CPU 14, along with commanding the CCD driver 13 to start accumulation of charge by the image sensor 12, also commands the LED driver 15 to start the supply of drive electrical current to the LED 16. Subsequently, in a similar manner, the operation of gradually changing the supplied electrical current so as gradually to enhance the light emission luminance of the LED 16 during charge accumulation by the image sensor 12, and of stopping the emission of light by the LED 16 when the charge accumulation by the image sensor 12 ends, is repeated.

By performing change of the illumination light during charge accumulation by the image sensor 12 in this manner so as gradually to enhance its luminance, it is possible to perform photography so that the shifting direction of the photographic subject may be understood by an observer of the photographic image, since the Contour of the image of the photographic subject upon each frame gradually becomes clearer along with lapse of the charge accumulation time period (the exposure time period). It should be understood that, in this case as well, the amount of light that is emitted by the LED 16 per one frame is determined by the CPU 14 during the above described exposure calculation. And the CPU 14 determines the maximum value c of the drive electrical current to be supplied to the LED 16, so that the integrated value over time of the light emitted from the LED 16 becomes equal to the amount of light per one frame that has thus been determined.

It would also be acceptable not to keep the rate of increase of the drive electrical current fixed, as in FIG. 6; a structure could be provided in which this rate of increase is changed along with time. For example, with the elapsed time from the light emission start time point t0 being termed t, it would be acceptable for the rate of increase to be given by $t^n$ or $\alpha^t$ (where n or $\alpha$ is constant).

Furthermore, it would also be acceptable to arrange to obtain the necessary amount of emitted light by performing repetition of pulsed light emission by the LED 16, within the range of the exposure time period that corresponds to the shutter setting that is set. In this case, the LED driver 15 is built so as, during charge accumulation by the image sensor 12, to perform PWM (pulse width modulation) control in which the light emission pulse width (time period) of a train of emitted light pulses is gradually widened; and a drive electrical current in pulse form is supplied by this LED driver 15 to the LED 16. Since, with this PWM control, the light emission density of the illumination light gradually increases along with the passage of the charge accumulation time period (the exposure time period), accordingly the contour of the image of the photographic subject for each frame gradually becomes clearer along with passage of the charge accumulation time period (the exposure time period). As a result, it is possible to perform photography so that the direction of shifting of the photographic subject can be understood by an observer of the photographic image.

It would also be acceptable for the start timing of light emission by the LED 16 not necessarily to match with the start time point t0 of charge accumulation by the image sensor 12. Furthermore, it would also be acceptable for the ending timing of light emission by the LED 16 not necessarily to match with the ending time point t2 of charge accumulation by the image sensor 12.

In the above explanation, it was arranged to determine the amount of light emitted by the LED 16 per one frame during the exposure calculation by the CPU 14, and to determine the value of the drive electrical current to be supplied to the LED 16 based upon this amount of light emission that has thus been determined. Instead of this it would also be acceptable to provide a structure in which, subsequent to the start of light emission by the LED 16, the integrated value over time of the reflected light as detected by a flash control element (not shown in the figures) is monitored, and the supply of electrical current to the LED 16 is stopped when this integrated value over time has reached a predetermined value.

Furthermore, in the above explanation, it was arranged gradually to enhance the luminance of the illumination light by changing the drive electrical current supplied to the LED 16. However, if the LED 16 is constituted as a plurality of individual LEDs, then it would also be acceptable to provide a structure with which the luminance of the illumination light is enhanced by increasing the number of the LEDs that are simultaneously caused to emit light, instead of by increasing the value of the electrical current that is supplied to each of the LEDs. It should be understood that it would also be acceptable to combine both increase of the electrical current value that is supplied to each of the LEDs, and also increase of the number of the LEDs that are simultaneously caused to emit light.

Although, by way of example, a case has been explained in which the electronic camera 1 is set to the movie shooting mode, the present invention can also be applied to a still image photographic (shooting) mode, if the shutter setting is, for example, set to longer than ⅓₀ sec. Furthermore, the present invention can also be applied to a video camera that is dedicated to movie shooting.

When attention is directed to the still image photographic mode, the present invention is not limited to the case of an electronic camera; it can also be applied to the case of performing photography with a film camera.

In the above description, an example was explained in which the shutter setting is set to longer than ¹⁄₆₀ sec., the luminance of the LED 16 is changed within this exposure time period. However, if the shutter setting is shorter than ¹⁄₆₀ sec., it would be acceptable to arrange to keep the luminance of the LED 16 constant. In other words, it would also be acceptable to arrange to change the luminance of the LED 16 if the shutter setting is greater or longer than or equal to ¹⁄₆₀ sec., and to keep the luminance of the LED 16 constant if the shutter setting is less than ¹⁄₆₀ sec. It should be understood that, by the shutter setting being less than ¹⁄₆₀ sec., is meant that the shutter speed is faster than a shutter setting of ¹⁄₆₀.

In the embodiment described above, a method of increasing the light emission luminance of the LED 16 stepwise in two stages was explained; and, in the variant embodiment described above, a method of gradually increasing the light emission luminance of the LED 16 was explained. However, it would also be acceptable to arrange for the CPU 14 to be able to perform control by changing over between these two methods. For example, it would be acceptable to provide a changeover switch that changes over between these two methods, and to arrange for it to be possible to select one among these two methods upon a menu screen of the camera.

Although this illumination device for photography (the LED 16 and the LED driver 15) has been explained, by way of example, in a case in which it is incorporated in an electronic camera 1, it would also be possible to apply the present invention to a case in which the illumination device for photography is made as a device of the type that is attached externally to a camera, and is used in combination with a camera.

Although various embodiments and variant embodiments have been explained in the above description, the present invention is not to be considered as being limited by the details thereof. Other modes of implementation that may be conceived of within the scope of the technical concept of the present invention are also included within the range of the present invention.

The content of the disclosure of the following application, upon which the priority right is claimed, is hereby incorporated by reference:

Japanese Patent Application 2005-038920 (filed Feb. 16, 2005).

The invention claimed is:

1. An illumination device for photography, comprising:
    a light emission unit that emits illumination light towards a photographic subject; and
    a control unit that performs control so as to change a light emission luminance of the light emission unit within an exposure time period that is set to the camera, wherein:
        the control unit performs control so that, within the exposure time period, a luminance according to a first light emission time period is made as a first light emission luminance, and a luminance according to a second light emission time period that succeeds the first light emission time period is made as a second light emission luminance that is higher than the first light emission luminance; and
        the control unit performs control so that the second light emission time period becomes shorter than the first light emission time period.

2. An illumination device for photography according to claim 1, wherein:
    the light emission unit is of an electrical current control type;
    there is further provided an electrical current supply unit that supplies drive electrical current to the light emission unit; and
    the control unit controls the electrical current supply unit so as to supply to the light emission unit an electrical current that causes the light emission luminance of the light emission unit to change within the exposure time period that is set to the camera.

3. An illumination device for photography according to claim 2, wherein:
    the control unit controls the electrical current supply unit so that a value of the electrical current supplied to the light emission unit changes.

4. An illumination device for photography according to claim 2, wherein:
    the light emission unit comprises a plurality of light emission elements; and
    the control unit controls the electrical current supply unit so as to change the number of the light emission elements to which the electrical current is supplied.

5. An illumination device for photography according to claim 1 wherein:
    the second light emission time period is included within a predetermined time period directly before the end of the exposure time period.

6. An illumination device for photography according to claim 1, wherein:
    the control unit performs control so that the light emission luminance of the light emission unit is changed in each frame, if the camera is set to a movie shooting mode.

7. An illumination device for photography according to claim 6, wherein:
   the control unit performs control so that the emission of light by the light emission unit is stopped at least outside the exposure time period of each frame, if the camera is set to the movie shooting mode.

8. A camera, comprising:
an illumination device for photography according to claim 1.

9. An illumination device for photography, comprising:
a light emission unit that emits illumination light towards a photographic subject; and
a control unit that performs control so as to change a light emission luminance of the light emission unit within an exposure time period that is set to the camera, wherein:
   the control unit performs control so that the light emission luminance of the light emission unit is changed, when the exposure time period is longer than a predetermined shutter setting.

10. An illumination device for photography according to claim 9, wherein:
   the control unit performs control so that the light emission luminance of the light emission unit is changed in each frame, if the camera is set to a movie shooting mode.

11. An illumination device for photography according to claim 10, wherein:
   the control unit performs control so that the emission of light by the light emission unit is stopped at least outside the exposure time period of each frame, if the camera is set to the movie shooting mode.

12. A camera, comprising:
an illuminination device for photography according to claim 9.

13. An illumination device for photography, comprising:
a light emission unit that emits illumination light towards a photographic subject; and
a control unit that performs control so as to change a light emission luminance of the light emission unit within an exposure time period that is set to the camera, wherein:
   the control unit performs control so as to be able to change over between a first control method in which it performs control so that, within the exposure time period, the light emission luminance of the light emission unit gradually increases from when light emission starts to when light emission ends, and a second control method in which it performs control so that, within the exposure time period, a luminance according to a first light emission time period is made as a first light emission luminance, and a luminance according to a second light emission time period that succeeds the first light emission time period is made as a second light emission luminance that is higher than the first light emission luminance.

14. A camera, comprising:
an illumination device for photography according to claim 13.

* * * * *